United States Patent
Bush et al.

(10) Patent No.: US 10,990,300 B2
(45) Date of Patent: *Apr. 27, 2021

(54) METHODS FOR RESTRICTING READ ACCESS TO SUPPLY CHIPS

(71) Applicant: Lexmark International, Inc., Lexington, KY (US)

(72) Inventors: Stephen Porter Bush, Richmond, KY (US); Jennifer Topmiller Williams, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,564

(22) Filed: Apr. 15, 2019

(65) Prior Publication Data

US 2019/0340372 A1 Nov. 7, 2019

Related U.S. Application Data

(60) Provisional application No. 62/658,552, filed on Apr. 16, 2018.

(51) Int. Cl.
*G06F 3/06* (2006.01)
*G06F 11/07* (2006.01)
*G06F 21/71* (2013.01)
*G06F 21/62* (2013.01)
*G11C 29/14* (2006.01)

(52) U.S. Cl.
CPC .......... *G06F 3/0623* (2013.01); *G06F 3/0659* (2013.01); *G06F 3/0679* (2013.01); *G06F 11/0754* (2013.01); *G06F 21/62* (2013.01); *G06F 21/71* (2013.01); *G11C 29/14* (2013.01)

(58) Field of Classification Search
CPC .... G06F 3/0623; G06F 3/0659; G06F 3/0679; G06F 11/0754; G06F 21/62; G06F 21/71; G11C 29/14
See application file for complete search history.

(56) References Cited

U.S. PATENT DOCUMENTS 8,635,455 B2 * 1/2014 Starr ............... H04L 9/003
380/277

* cited by examiner

*Primary Examiner* — Eric Cardwell

(57) ABSTRACT

An example method for restricting read access to content in the component circuitry and securing data in the supply item is disclosed. The method identifies the status of a read command, and depending upon whether the status disabled or enabled, either blocks the accessing of encrypted data stored in the supply chip, or allows the accessing of the encrypted data stored in the supply chip.

5 Claims, 3 Drawing Sheets

METHODS FOR RESTRICTING READ ACCESS TO SUPPLY CHIPS

CROSS REFERENCE TO RELATED APPLICATIONS

Pursuant to 35 U.S.C. § 119, this application is related to and claims the benefit of the earlier filing date of provisional application Ser. No. 62/658,552, filed Apr. 16, 2018, entitled "Supply Chips and Methods for Restricting Read Access Thereof," the contents of which is hereby incorporated by reference herein in their entirety. In addition, this patent application is related to the U.S. patent application Ser. No. 16/384,580 entitled "Supply Chips and Methods for Restricting Read Access Thereof," which is filed contemporaneously herewith and assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present invention relates to securing data in non-volatile memories and more particularly to methods of restricting access to data in supply item chips.

2. Description of the Related Art

Most replaceable components for an imaging device, such as a toner cartridge, an imaging unit, and the like, include a smart chip for securing communications between the imaging device (host) and the replaceable component when the replaceable component is installed in the imaging device. Communications between the imaging device and the component may be encrypted. Authentication keys may be stored in both a memory of the imaging device and a memory associated with the smart chip so the imaging device and the component may be able to communicate in a secure manner. Since manufacturing companies are generally an open and thus an untrusted environment (i.e., data in chips may be altered and/or copied), secure servers are commonly used to store the keys and other sensitive information written in the smart chip. A secure wired connection is often required between the place where the secure servers are stored (e.g., cage) and the stations where each chip of the replaceable components is being programmed. Following programming of the chips, the replaceable component may be locked and put into "mission mode" such that any reads of the component's memory contents require authentication and session key agreement.

Prior to shipment of the replaceable components to end-users, it is desirable to re-read the contents of the smart chip to verify whether or not the chip has been programmed correctly and that no damage has occurred since the programming. Chip verification stations are typically separate from the programming stations in manufacturing. As such, having another wired connection between chip verification stations and secure servers in order to facilitate the authentication required to allow reading of the chip's contents is often impractical.

One solution for verifying the chip's contents is to disable authentication required in accessing the chips and allow verification devices to access content. Another solution is to store authentication keys on the chip verification stations. However, both solutions present security issues. In particular, since the manufacturing environment is generally an untrusted environment, chip content may be leaked or the chips may be vulnerable to key extraction attacks by adversaries. Yet another solution would be to have a dedicated imaging device to act as a verification device since imaging devices contain required authentication keys to be able to communicate with the smart chips. This solution requires, however, providing multiple printers of different families or models and managing their respective spare parts and firmware updates. Providing printers to use as test devices on the manufacturing floor may not only be logistically complicated but also adds costs and tasks. Thus, there is a need to employ other systems and methods of checking the contents of each replaceable component without exposing the contents of the smart chip.

SUMMARY

Example component circuitry for a supply item including an example method for restricting read access to content in the component circuitry and an example method for securing data in the supply item are disclosed.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
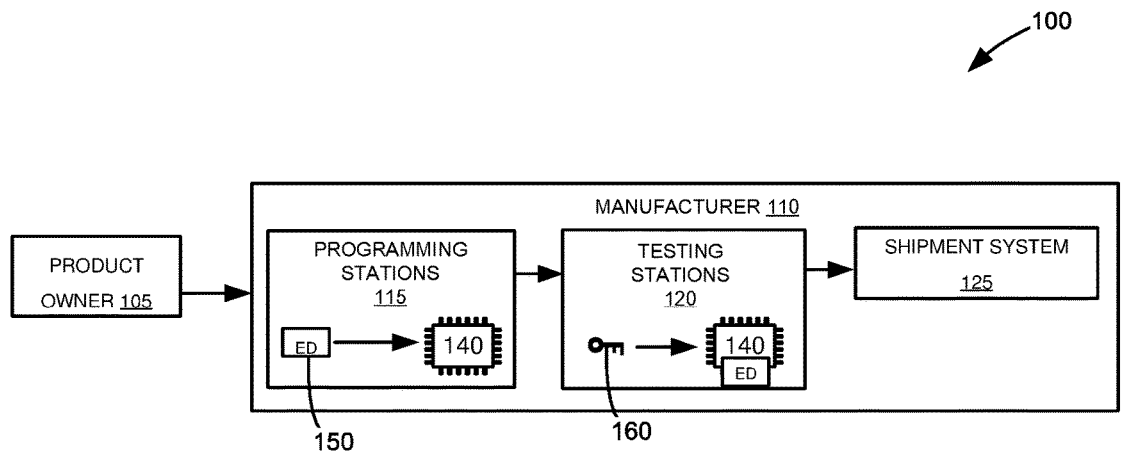
FIG. 1 is a block diagram of an example system of producing chips for electronic devices, according to one example embodiment.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including", "comprising", or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions, and program instruction means for performing the specified functions. It will also be understood that each block of the diagrams, and combinations of blocks in the diagrams, may be implemented by special purpose hardware-based computer systems that perform the specified functions or steps, or combinations of special purpose hardware and computer instructions.

FIG. 1 is a block diagram of an example system of producing chips for electronic devices, according to one example embodiment. For purposes of illustration, example system 100 includes a product owner 105 and a manufacturer 110. Manufacturer 110 is illustrated to include one or more programming stations 115, one or more test stations 120, and a product delivery or shipment system 125. As is known in the art, programming stations 115 and test stations 120 may refer to the same station. However, for purposes of discussing the present disclosure, programming stations 115 and test stations 120 may be separate stations and are numbered differently in FIG. 1.

As is known in the art, owner 105 may provide data to be embedded by manufacturer 110 in a blank circuitry or chip 140. In one example embodiment, chip 140 may be configured to operate or work with a printer supply item, such as a toner cartridge. Data for provisioning to chip 140 may include certificates containing parameters for configuration, authorized usage, compatibility, toner properties, etc. For purposes of expediency, the manufacturing process may be simplified in 3 stages—provisioning, testing and delivery to the market. While not shown, stations 115, 120, and 125 may be manned by a person. For the provisioning stage, each programming station 115 may include known hardware and software to provision data to chip 140. For the testing stage, each test station 120 may include known hardware and software necessary to verify completeness and accuracy of data within chip 140. For the delivery stage, shipment system 125 may include any known shipment methods for delivering products to market end-users or resellers.

Since manufacturing factories are generally considered an untrusted environment, owner 105 may encrypt the data for inclusion on chip 140, according to one example embodiment of the present disclosure. Owner 105 may provide encrypted data 150 to one or more programming stations 115. One or more programming stations 115 may program encrypted data 150 received from owner 105 to chip 140. Following the provisioning of chip 140 with encrypted data 150, chip 140 may be passed on to one or more test stations 120 for testing. Each test station 120 may determine whether chip 140 includes encrypted data 150, as will be discussed in greater detail with respect to FIG. 2. In addition, owner 105 may provide a key 160 to at least one of test stations 120. Key 160 may be used to decrypt encrypted data 150 and to determine whether the contents on chip 140 are still correct. Following the testing stage, chip 140 may be ready for delivery by shipment system 125.

In other example embodiments, owner 105 may provide unencrypted data rather than encrypted data to one or more programming stations 115 because the device is in a manufacturing mode. In still other example embodiments, one or more programming stations 115 may program unencrypted data from owner 105 to chip 140. In such example embodiments, unencrypted data may be encrypted with key 160 when chip 140 or the device receives a read command. When chip 140 or the device reaches testing station 120, the device or chip 140 is no longer in the manufacturing mode but rather in mission mode. In order to read data from chip 140 without authenticating in mission mode, key 160 is used to decrypt the data.

Figure 2:
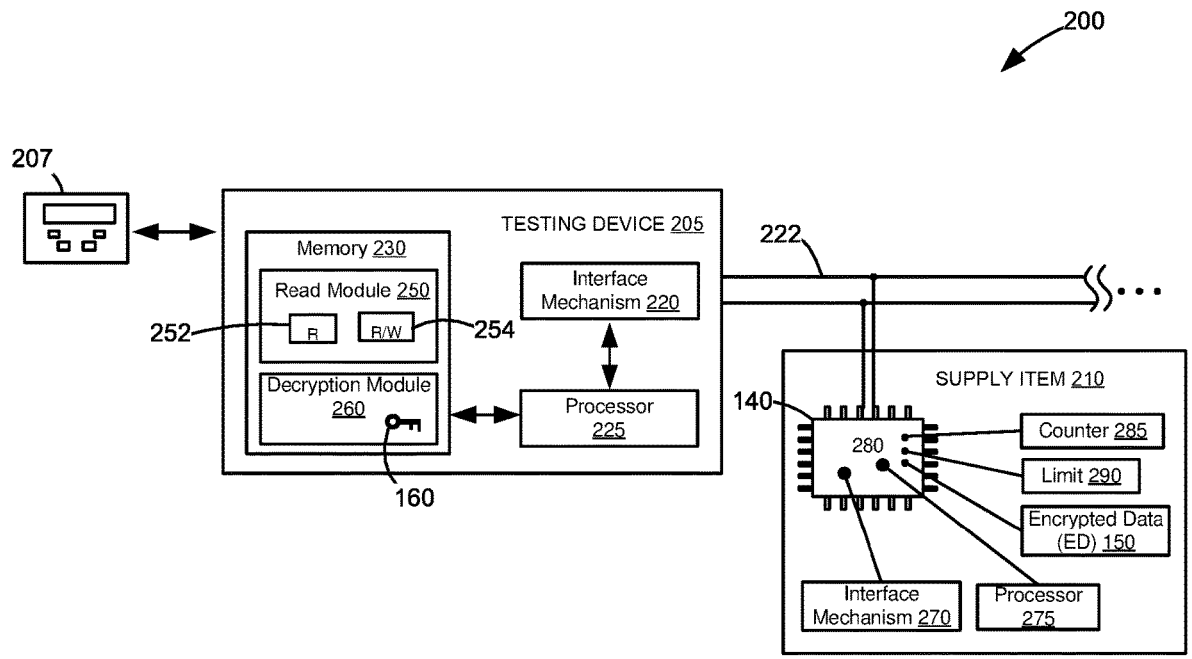
FIG. 2 is a schematic diagram of an illustrative electrical interface between an example testing device and an example supply item equipped with the example chip from FIG. 1.

FIG. 2 is a schematic of an illustrative electrical interface system 200 between an example testing device 205 and an example supply item 210 equipped with chip 140 from FIG. 1. Testing device 205 is shown to include an interface mechanism 220, a controller or processor 225, and a memory 230. Memory 230 may include a read module 250 and a decryption module 260 including key 160 (see FIG. 1). Supply item 210 may include chip 140. Chip 140 is shown to include an interface mechanism 270, a processor 275, and a non-volatile memory 280 which includes: encrypted data 150, a counter module 285, and a limit 290. In some other example embodiments, chip 140 may include unencrypted data in memory 280.

Testing device 205 may refer to any electronic processing device for one or more test stations 120 shown in FIG. 1. Testing device 205 may include instructions used for verifying the integrity of chip 140. For purposes of discussion, one testing device 205 is shown to be communicatively connected to one example supply item 210. However, it is to be understood that one testing device 205 may be connected to multiple chips (140) via a multiplexer or other like item. Testing device 205 may include other components that may be required to allow testing device 205 to communicate with and to verify the content of chip 140, such as an electrical provider.

Supply item 210 may refer to device hardware with which chip 140 may be associated or configured to operate. While FIG. 2 shows chip 140 as being configured as part of supply item 210, it is to be understood that chip 140 may be operated separately from supply item 210. As such, chip 140 may be configured to be part of supply item 210 following the testing stage. In the present disclosure, supply item 210 may refer to a replaceable component for installation to an imaging device (not shown). For example, supply item 210 may be a toner cartridge, an imaging unit, a replacement kit, and the like.

Interface mechanism 220 may be any known communications interface allowing testing device 205 to communicate with chip 140. In one example embodiment, interface mechanism 220 may be a master-slave communications interface. In the present disclosure, interface mechanism 220 follows the Inter-Integrated Circuit ("I²C") protocol. In some other example embodiments, interface mechanism 220 may be any known bus communication protocols such as System Management Bus (SMB), UNI/O bus, or other protocols used in bus structures having master/slave configurations. In the context of FIG. 2, processor 225 and chip 140 may be configured as master and slave, respectively. Interface mechanism 220 may be used by processor 225 to send commands and responses to other devices connected along a communication bus or interface 222. Interface mechanism 220 may allow a plurality of chips 140 to be connected with processor 225.

Processor 225 may be generally configured to control communications sent along interface mechanism 220. Processor 225 may also control access to memory 230. Processor 225 may include instructions associated with setting configurations of testing device 205. In some example embodiments, processor 225 may include associated memory 230. Processor 225 may process communications received via interface mechanism 220.

Memory 230 may refer to any type of storage portion for storing instructions for testing device 205. Memory 230 may be a volatile memory, a non-volatile memory, or a combination of both. Memory 230 may include a set of configuration parameters for testing device 205. Data stored in memory 230 may include an address of supply item 210, which may be transmitted along communications bus 222 and used by processor 225 to communicate with chip 140. A user interface 207 may be integrated into or otherwise connected to testing device 205. User interface 207 may be used to store, access, and/or modify data in memory 230.

In the present disclosure, data stored in memory 230 may include read module 250 and decryption module 260 having key 160. Read module 250 may include a set of predetermined read commands including instructions for reading memory 280 of chip 140. The read commands stored in memory 230 may include a first command 252 and a second command 254. Processor 225 may separately send first command 252 and second command 254 to supply item 210 via communications bus 222. In one example embodiment, first command 252 may be sent to supply item 210 before second command 254. In another example embodiment, second command 254 may be sent to supply item 210 before first command 252. In still another example embodiment, processor 225 may first send one read command to supply item 210 and may then wait for a response from supply item 210 prior to sending another read command.

First command 252 may be a set of instructions for reading a Read-Only portion of memory 280. In one example aspect, the Read-Only portion of memory 280 may be a general non-volatile area of memory 280. Second command 254 may be a set of instructions for reading a Read-Write portion of memory 280. In one example aspect, the Read-Write portion of memory 280 may be another non-volatile area of memory 280 separate from the Read-Only portion. In the present disclosure, each of first and second commands 252, 254 is not encrypted. However, usage thereof in each chip 140 may be limited to a predetermined number of times.

Decryption module 260 and key 160 may be stored in memory 230 of testing device 205. In the present disclosure, decryption module 260 and key 160 may be used to decrypt encrypted data 150 stored in memory 280 of chip 140 read using either command 252 or 254. Decryption module 260 may be any known decryption function known in the art. In other example embodiments, decryption module 260 and key 160 may be part of a single decryption functionality stored in memory 230 of testing device 205. In yet other example embodiments, there may be multiple testing devices 205 connected to one server along the production floor (not shown). In this example embodiment, decryption module 260 and key 160 may be stored in the server for accessing by each testing device 205 instead of in each testing device 205.

In some example embodiments, memory 280 of chip 140 may store encrypted data 150 associated with supply item 210. In order to prevent casual eavesdropping attacks by other devices in manufacturer 110, data 150 may be encrypted. In other example embodiments, memory 280 of chip 140 may store unencrypted data associated with supply item 210, and data may be encrypted with key 160 during the read. Counter module 285 may be used to store a number of times that testing device 205 sent first command 252 and/or second command 254 to supply item 210 for accessing content in memory 280. Counter module 285 may include a first counter for a number of times that first command 252 is sent and a second counter for a number of times that second command 254 is sent. In one example embodiment, counter module 285 may store a number of times that encrypted data 150 has been accessed in memory 280 following receipt of a command from testing device 205. Memory 280 may also be used for storing limit 290 for comparison with the value (i.e., number of access times) stored in counter module 285. Limit 290 may be a predetermined number of times that data stored in memory 280 of chip 140 may be accessed by first command 252 and/or second command 254. In one example embodiment, limit 290 may be set by owner 105. Limit 290 may be provided by owner 105 to manufacturer 110 in FIG. 1, together with encrypted data 150 for programming into chip 140.

Details on how testing device 205 verifies the integrity of chip 140 prior chip to 140 being shipped and produced as part of the testing state (see FIG. 1) will now be discussed using the following example flowcharts.

Figure 3:
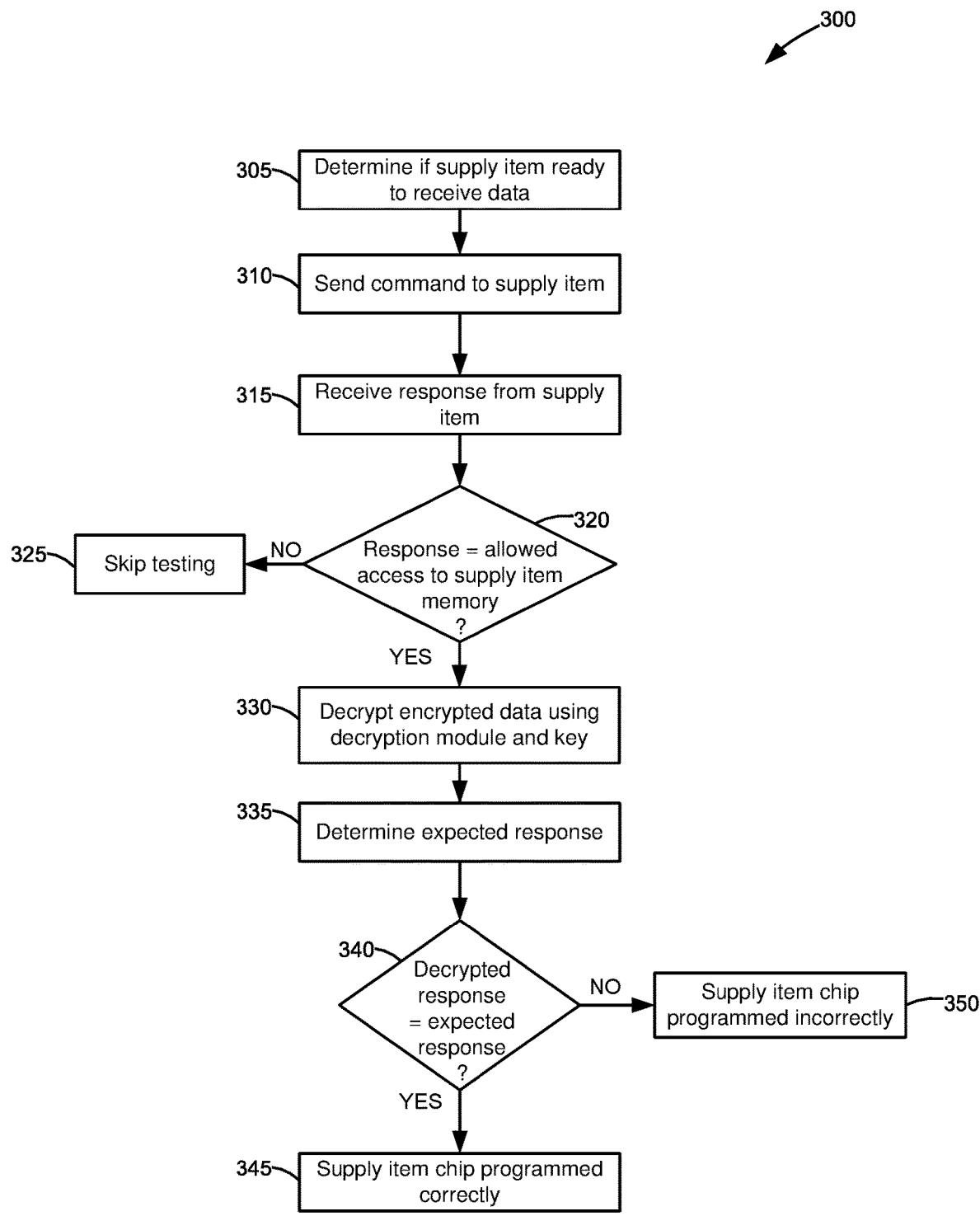
FIG. 3 is a flowchart of an example method for sending at least one read command to a chip of a supply item, according to one example embodiment.

FIG. 3 is a flowchart of an example method 300 for sending at least one of commands 252, 254 to chip 140 of supply item 210, according to one example embodiment. Actions in blocks 305-350 may be performed by testing device 205 of FIG. 2. Recipients of actions performed in blocks 305-350 may refer to components shown in FIG. 2. Example method 300 may also determine whether or not chip 140 is programmed correctly based upon responses to command(s) sent by testing device 205.

At block 305, testing device 205 may determine if supply item 210 is ready to receive data. In one example embodiment, testing device 205 may determine a status of supply item 210 along communications interface 222. In one example aspect, testing device 205 may determine an address of supply item 210 along communications interface 222 in order to determine the status thereof. In another example aspect, testing device 205 may send a query to supply item 210 regarding a status thereof. In other example embodiments, block 305 may be optional.

At block 310, following a determination that the status of supply item 210 indicates availability of supply item 210 to accept data from testing device 205, testing device 205 may send at least one of first command 252 and second command 254 to supply item 210. One of commands 252 and 254 may be received in supply item 210. In one example embodiment, prior to performing block 310, testing device 205 may determine which of first command 252 and second command 254 to send to supply item 210 first and, in particular, to chip 140.

In one example embodiment, commands 252 and 254 may be sent individually to supply item 210. First command 252 may be sent to supply item 210 prior to second command 254 or vice-versa. In another example embodiment, commands 252 and 254 may be sent as a single command package to supply item 210.

At block 315, testing device 205 may receive a response from supply item 210 based upon one of commands 252, 254 sent in block 310. A response of supply item 210 to each command sent by testing device 205 will be detailed in FIG. 4 below. The response may include an address or region in memory 280 storing encrypted data 150. In one example embodiment, testing device 205 may be allowed access by supply item 210 to memory 280. In another example embodiment, each command sent at block 310 may be ignored by supply item 210, and testing device 205 may be blocked from accessing memory 280 of supply item 210. In still other example embodiments, supply item 210 may respond with an error when the command limit is reached.

At block 320, testing device 205 may determine whether the response of supply item 210 to the command sent at block 310 indicates supply item 210 will allow testing device 205 access to contents of memory 280 of chip 140. In one example embodiment, the response of supply item 210 to the command may include encrypted data 150. In other example embodiments, supply item 210 may not respond to the command sent by testing device 205 at block 310 such that testing device 205 may not receive any response. In yet other example embodiments, a response of supply item 210 may indicate that testing device 205 is not allowed to access memory 280 of chip 140.

At block 325, where no response is received in block 320 or where testing device 205 is not allowed by supply item 210 access to memory 280, testing device 205 may skip testing supply item 205.

At block 330, testing device 205 may decrypt encrypted data 150 stored in memory 280. In one example embodiment, testing device 205 may decrypt encrypted data 150 using decryption module 260 and key 160 stored in memory 230. In one example aspect, testing device 205 may store data temporarily in memory 230 of testing device 205 when decrypting encrypted data 150 such that no data is displayed or logged in memory 230 following the decryption. In other example embodiments, decryption module 260 and key 160 may be provided by a server (not shown) to testing device 205. Other methods for decrypting encrypted data may be known in the art.

At block 335, testing device 205 may determine an expected response. The expected response may include verifying that testing device 205 has the proper identity and serial number. In one example embodiment, the expected response may be stored in memory 230 of testing device 205.

At block 340, testing device 205 may then determine whether the decrypted response (block 330) matches the expected response (block 335). At block 345, testing device 205 may determine that chip 140 is programmed correctly for supply item 210 when both responses match. When chip 140 is determined to be programmed correctly, testing device 205 may identify supply item 210 as ready for shipment to end users. Otherwise, at block 350, upon a determination by testing device 205 that the data in the expected response and the received response do not match, testing device 205 may identify supply item 210 as being programmed incorrectly. To that end, testing device 205 may tag chip 140 in supply item 210 as a defect.

Figure 4:
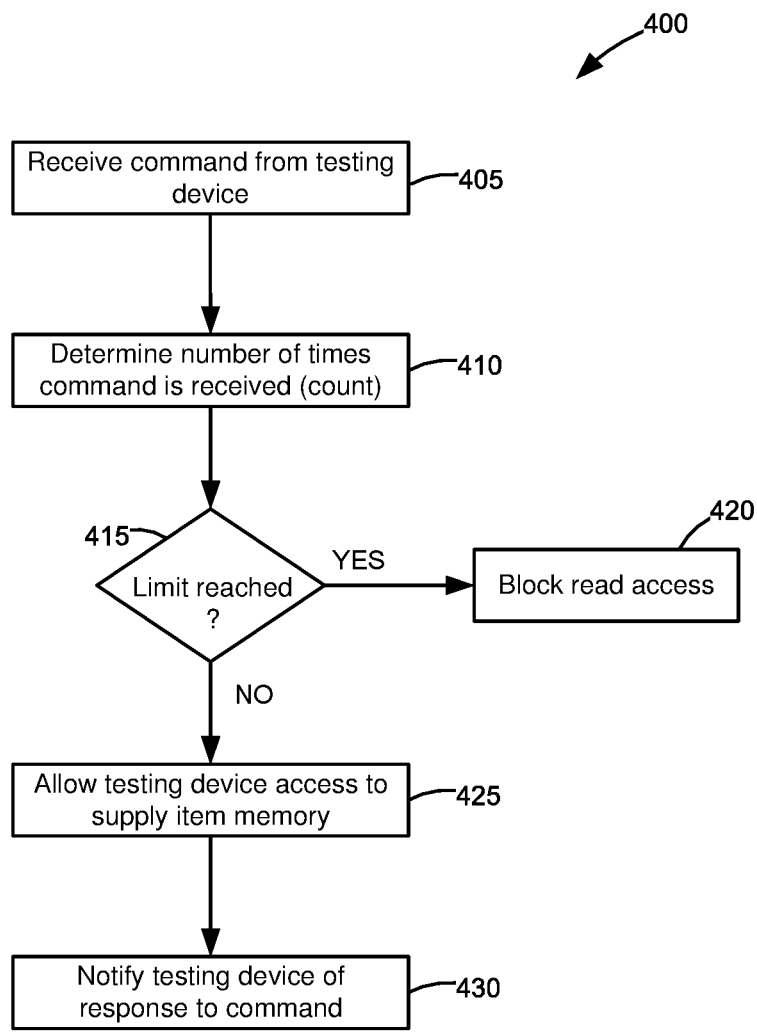
FIG. 4 is a flowchart of an example method for updating access to a supply item, according to one example embodiment.

FIG. 4 is a flowchart of an example method 400 for updating access to supply item 210, according to one example embodiment. Actions in blocks 405-430 may be performed by chip 140 in supply item 210. Example method 400 may performed in conjunction with example method 300 of FIG. 3.

At block 405, chip 140 may receive a command from testing device 205 (block 310 in FIG. 3). The command may be one of first command 252 and second command 254. As discussed above, command 252 or 254 may include an identifier of supply item 210 or chip 140. In one example embodiment, command 252 or 254 may include a memory offset region where encrypted data 150 may be stored.

At block 410, chip 140 may determine a number of times that the command is received in supply item 210. Chip 140 may refer to counter module 285 to determine the number of times. Counter module 285 may increment the number of times each time a read command (first command 252 and second command 254) is received from testing device 205. While not shown, commands 252 and 254 may each have its own count of a number of times that each is received in chip 140. As discussed above, counter module 285 may be used to store a first count for a number of times that first command 252 is received by chip 140 and a second count for a number of times that second command 254 is received.

At block 415, chip 140 may determine whether the number of times determined at block 410 (for either first command 252 or read command 254) reached predetermined limit 290. Limit 290 may be a predetermined numerical value indicating a number of times that chip 140 in supply item 210 may be accessed by testing device 205 before disabling access to testing device 205. In some example embodiments, limit 290 may be set to 3 times.

In one example embodiment, limit 290 may be used to enable and to disable access of testing device 205 to encrypted data 150 in memory 280 of supply item 210. A read access status variable may be defined in supply item 210 to track whether any testing device 205 is allowed access to content in memory 280. For example, the read access status may be set to "enabled" when the number of times that encrypted data 150 is accessed has not reached limit 290. Otherwise, the read access status may be set to "disabled" when the number of times that encrypted data 150 is accessed has reached or is past limit 290.

At block 420, upon a determination by chip 140 that the count of the number of times that the command is received has reached predetermined limit 290, chip 140 may disable testing device 205 from accessing memory 280. In one example embodiment, chip 140 may notify processor 280 to block testing device 205 from reading chip 140. In other example embodiments, chip 140 may be programmed to receive but ignore read commands from testing device 205 when limit 290 has been reached.

At block 425, upon a determination by chip 140 that the count of the number of times that the command is received is below predetermined limit 290, chip 140 may allow testing device 205 to access memory 280 and read encrypted data 150.

At block 430, following responding to the command received from testing device 205, chip 140 may notify testing device 205 of the response being made. In one example embodiment, chip 140 may include instructions to notify testing device 205 that access to chip 140 has been blocked following a determination that limit 290 has been reached (block 420). In another example embodiment, chip 140 may include instructions to notify testing device 205 that testing device 205 is allowed access to memory 280 in chip 140 following a determination that the number of times has not reached the value indicated in limit 290 (block 425). In some example embodiments, encrypted data 150 may be included or returned in the response. This notification from chip 140 may be received by testing device 205 in the form of a command response at block 315 (FIG. 3). In other example embodiments, block 430 may be optional.

It will be appreciated that the actions described and shown in the example flowcharts may be carried out or performed in any suitable order. It will also be appreciated that not all of the actions described in FIGS. 3 and 4 need to be performed in accordance with the example embodiments and/or additional actions may be performed in accordance with other example embodiments.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A method for securing data in a supply chip, comprising:
   receiving, by the supply chip, a read command from a testing device;
   upon receiving the read command, identifying a status of processing the read command;
   determining whether the status is one of disabled and enabled;
   upon a determination that the status is disabled, blocking the testing device from accessing encrypted data stored in the supply chip;
   upon a determination that the status is enabled, a response by the supply chip to the testing device that includes an address or region of memory storing encrypted data, and allowing the testing device to access the encrypted data stored in the supply chip; and
   storing the encrypted data temporarily in the memory of the testing device when decrypting the encrypted data such that no data is displayed or logged in the memory of the testing device following the decryption.

2. The method of claim 1, further comprising tracking a number of times that the encrypted data stored in the supply chip is accessed and determining whether to one of disable and enable the status of processing the read command in the electronic device, wherein the determining is based upon whether or not the number of times reaches a predetermined limit.

3. The method of claim 2, wherein the status is disabled when the number of times reaches the predetermined limit and wherein the status is enabled when the number of times is below the predetermined limit.

4. The method of claim 1, wherein the encrypted data is stored in a non-volatile memory of the supply chip.

5. The method of claim 1, wherein the supply chip allows the testing device to send a command thereto without requiring the testing device to authenticate.

* * * * *